United States Patent
Takenaka

(10) Patent No.: US 8,821,300 B2
(45) Date of Patent: Sep. 2, 2014

(54) TORSIONAL VIBRATION ATTENUATION APPARATUS

(75) Inventor: Tetsuhiro Takenaka, Miyoshi (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/881,462

(22) PCT Filed: Nov. 26, 2010

(86) PCT No.: PCT/JP2010/006907
§ 371 (c)(1),
(2), (4) Date: Apr. 25, 2013

(87) PCT Pub. No.: WO2012/070092
PCT Pub. Date: May 31, 2012

(65) Prior Publication Data
US 2013/0231195 A1    Sep. 5, 2013

(51) Int. Cl.
*F16F 15/123* (2006.01)
*F16F 15/12* (2006.01)
*F16D 3/12* (2006.01)

(52) U.S. Cl.
CPC .............. *F16D 3/12* (2013.01); *F16F 15/1232* (2013.01); *F16F 15/1205* (2013.01)
USPC ...................................... 464/68.6

(58) Field of Classification Search
CPC ...... F16F 15/1205; F16F 15/1232; F16D 3/12
USPC ................ 464/68.4, 68.41, 68.6, 68.9, 68.92; 192/204, 205, 214, 214.1
See application file for complete search history.

(56) References Cited

U.S. PATENT DOCUMENTS

| | | | |
|---|---|---|---|
| 4,467,905 A * | 8/1984 | Takeuchi | 464/68.4 |
| 8,210,951 B2 * | 7/2012 | Schober et al. | 464/68.9 |
| 2003/0087704 A1 | 5/2003 | Takeuchi et al. | |
| 2009/0272614 A1 | 11/2009 | Watarai | |
| 2012/0238368 A1 * | 9/2012 | Watarai | |

FOREIGN PATENT DOCUMENTS

| | | |
|---|---|---|
| JP | A-9-280317 | 10/1997 |
| JP | A-2001-74102 | 3/2001 |
| JP | A-2001-304341 | 10/2001 |
| JP | A-2003-194095 | 7/2003 |
| JP | A-2008-25629 | 2/2008 |

* cited by examiner

*Primary Examiner* — Gregory Binda
(74) *Attorney, Agent, or Firm* — Oliff PLC

(57) ABSTRACT

A torsional vibration attenuation apparatus includes a driving rotation member and a driven rotation member which can be twisted in an enlarged torsion angle range with a non-linear torsional property, thereby preventing an excessively large torque from being transmitted from driving member to the driven member. The torsional vibration attenuation apparatus includes a boss, a cam member having a cam surface formed in an elliptical shape and provided on the outer peripheral portion of the boss to be integrally rotated with the boss, and a pair of arm members each provided between the cam member and a coil spring and having one end held in contact with the can surface and the other end held in engagement with a spring seat of the coil spring.

6 Claims, 17 Drawing Sheets

TORSIONAL VIBRATION ATTENUATION APPARATUS

TECHNICAL FIELD

The present invention relates to a torsional vibration attenuation apparatus, and more particularly to a torsional vibration attenuation apparatus which comprises a driving rotation member inputted with a rotational torque, and a driven rotation member for outputting the rotational torque, the driving rotation member and the driven rotational torque being relatively rotatably connected with each other through a resilient member.

BACKGROUND ART

As a torsional vibration attenuation apparatus of this type, there has so far been known a torsional vibration attenuation apparatus which comprises a drive source such as an internal combustion engine, an electric motor and the like, and driven wheels drivably connected with the drive source to be driven by the rotational torque transmitted from the drive source. The conventional torsional vibration attenuation apparatus is adapted to absorb the torsional vibrations between the drive source and a drive system having transmission gear sets.

The known torsional vibration attenuation apparatus is constituted for example by a driving rotation member adapted to be selectively coupled with or released from a drive source side flywheel, a driven rotational member connected with an input shaft forming part of a transmission, and a resilient member having the driving rotation member and the driven rotation member circumferentially resiliently connected with each other (see for example Patent Document 1).

The driving rotation member is constituted by a clutch disc, and a pair of disc plates provided radially inwardly of the clutch disc, while the driven rotation member is partly constituted by a hub not rotatably and axially movably connected with the input shaft of the transmission and disposed between the disc plates.

The hub has a cylindrical boss splined to the input shaft and a disc-like flange radially outwardly extending. The resilient member is merely constituted by a coil spring accommodated in a window hole formed in the flange and having circumferential both end portions supported on the circumferential both ends of the window hole and the circumferential both ends of additional window holes respectively formed in the pair of disc plates.

The known torsional vibration attenuation apparatus previously mentioned is constructed to have the coil spring circumferentially compressed between the clutch disc and the pair of disc plates and the hub when the clutch disc and the pair of disc plates and the hub are relatively rotated with one another, thereby making it possible to absorb and attenuate the torsional vibrations inputted to the driven rotation member from the driving rotation member.

On the other hand, it is well known in the art that there are generated abnormal noises at the idling time of a vehicle, and abnormal noises and muffled noises at the travelling time of the vehicle as transmission side noises generated by the torsional vibrations. It is therefore required to suitably set the torsional property of the torsional vibration attenuation apparatus in order to absorb the torsional vibrations leading to the generation of the above abnormal noises.

Here, the abnormal noises generated at the idling time of the vehicle are known to be constituted by what is called clattering noises, one kind of abnormal noises emitted as being "clattering" caused by the collisions of the gear pairs with no load. Those noises are generally caused by torsional vibrations originated from the rotational fluctuation caused by the torque fluctuation of the driving source at the idling time of the vehicle immediately after being speed changed to the neutral.

Further, the abnormal noises generated at the travelling time of the vehicle are known to be constituted partly by what is called chinking noises, one kind of abnormal noises emitted as being "chinking" from the collisions of the slipping gear pairs of the transmission gear sets caused by the torsional vibrations originated from the rotational fluctuation in response to the torque fluctuation of the driving source and caused by the torsional resonance of the driving system during the acceleration and deceleration of the vehicle.

In addition, the muffled noises are known as one kind of abnormal noises to be generated in the passenger room by the vibrations caused by the torsional resonance of the driving system originated from the torque fluctuation of the driving system. The torsional resonance of the driving system is usually caused at the normal travelling operation (for example around 2500 rpm of the rotational speed of the internal combustion engine), so that there is caused muffled noises in the passenger room at the normal travelling operation.

One of the conventional torsional vibration attenuation apparatuses having a torsional property suitably set is known for example by the following Patent Document 2. The known torsional vibration attenuation apparatus comprises a cylindrical boss constituting a driven rotation member, and a disc-like flange radially outwardly extending from the boss. Between the outer peripheral portion of the boss and the inner peripheral portion of the flange is disposed a small coil spring having a small spring constant to absorb the torsional vibrations of the boss and the flange.

A pair of disc plates are each formed with a first window portion and a second window portion which are spaced apart from each other in the circumferential direction of the disc plates.

The flange is formed with a first window hole and a second window hole respectively facing the first window portion and the second window portion. The first window portion and the first window hole accommodate therein a first coil spring and a first seat member. The first coil spring has a spring constant larger than the small spring.

The second window portion and the second window hole accommodate therein a second coil spring and a second seat member. The second coil spring has a spring constant larger than the small spring.

The first seat member is circumferentially spaced apart from the first window hole. The first coil spring has such a torsional property that the first coil spring is not compressed in a small torsional angle area where the second spring is compressed but compressed in a large torsional angle area.

The driving rotation member and the driven rotation member in the torsional vibration attenuation apparatus have a torsional property as shown in FIG. 17.

More specifically, only the small coil spring is compressed in the small torsional area of the clutch disc and the boss as in the state of the vehicle changed in speed from the idling state to the neutral state, thereby making the rigidity low in the small torsional angle area to suppress the clattering noises from being generated.

Further in the large torsional angle area, only the second coil spring is compressed, thereby obtaining an intermediate rigidity torsional property having a torque gently raised as shown by an arrow "a" in FIG. 17, thereby making it possible to suppress the muffled noises from being generated.

When the torsional angle is further increased to take a predetermined level, the first coil spring and the second coil spring are concurrently compressed to obtain a high rigidity torsional property having the torque sharply raised as shown by an arrow "b" in FIG. 17, thereby making it possible to suppress the chinking noises from being generated. This means that a multi-staged torsional property can be obtained.

However, the conventional torsional vibration attenuation apparatus encounter such a problem that there is caused rattling noises of the gears acting to transmit the rotational torque in the transmission at the stepped portion (bent portion in the graph) where the raising ratio of the transmission torque is fluctuated.

The rattling noises are constituted by a low frequency wave, and thus called "rattling noises". When the torque to be transmitted to the driven rotation member from the driving rotation member for example in the travelling state during the slow deceleration time of the vehicle is approximately zero Nm, the conventional torsional vibration attenuation apparatus encounters such a problem that there is generated an abrupt torque fluctuation in the stepped portion of the torsional property, thereby causing abnormal noises such as gear clattering noises caused by the bouncing of the gears.

In view of this problem, another torsional vibration attenuation apparatus capable of suppressing the rattling noses is known for example by the Patent Document 3. The known torsional vibration attenuation apparatus is not constructed to have a multi-staged torsional property but in the non-linear shape to make the torsional property not formed with the stepped portion of the torque fluctuation.

The known torsional vibration attenuation apparatus disclosed in the Patent Document 3 comprises a driving rotation member integrally rotated with the internal combustion engine, a driven rotation member coaxially and relatively rotatably disposed with the driving rotation member, and a displacement member relatively displaced with the driven rotation member. The displacement member is formed in the driving rotation member and has a contact portion moving along the contacted surface constituted to have the curvature varied in response to the relative rotation angle of the driving rotation member and the driven rotation member. The relative displacement of the displacement member is performed by the contact portion moving along the contacted surface in response to the relative rotation of the driving rotation member and the driven rotation member. The known torsional vibration attenuation apparatus further comprises a resilient member resiliently contractible in response to the relative displacement of the displacement member, and stopper portions respectively provided on the driving rotation member and the displacement member to be engageable with each other to regulate the relative rotation of the displacement member and the driving rotation member, thereby regulating the relative rotation of the driving rotation member and the driven rotation member.

CITATION LIST

Patent Literature

Patent Document 1: Japanese Patent Application Publication No. 2003-194095
Patent Document 2: Japanese Patent Application Publication No. 2001-304341
Patent Document 3: Japanese Patent Application Publication No. 2001-74102

SUMMARY OF INVENTION

Solution to Problem

The torsional vibration attenuation apparatus disclosed in the Patent Document 3 can suppress the clattering noises at the idling time of the vehicle by the deformation of the small spring, however, finds it constitutionally difficult to widen the torsion angle of the driving rotation member and the driven rotation member, resulting from a multiplicity of the first and second coil springs and the first and second seat members provided in series to absorb the torque fluctuation. For this reason, the torsional vibration attenuation apparatus cannot lower the torsional rigidity as a whole, and thus encounters such a problem that it is difficult to fully suppress the chinking noises at the travelling time of the vehicle.

The torsional vibration attenuation apparatus disclosed in the Patent Document 2 can suppress the rattling noises by making the torsional property of the driving rotation member and the driven rotation member in the non-linear shape, however, cannot widen the torsion angle of the driving rotation member and the driven rotation member, resulting from the fact that the stopper members are provided to be engageable with the driving rotation member and the displacement member to regulate the driving rotation member and the driven rotation member from being relatively rotated with each other. For this reason, the torsional vibration attenuation apparatus cannot lower the torsional rigidity of the driving rotation member and the driven rotation member as a whole, and thus encounters such a problem that it is difficult to fully suppress the chinking noises at the travelling time of the vehicle.

Further, the torsional vibration attenuation apparatus disclosed in the Patent Document 3 is constructed to regulate the driving rotation member and the driven rotation member from being relatively rotated with each other, so that when the driving rotation member is inputted with the excessively large torque from the internal combustion engine, the excessively large torque is likely transmitted to the transmission from the driving rotation member through the driven rotation member.

The present invention has been made to overcome the previously mentioned conventional problems, and it is therefore an object of the present invention to provide the torsional vibration attenuation apparatus which can widen the range of the torsion angle of the driving rotation member and the driven rotation member, and can obtain the torsional property in the non-linear shape, and can prevent the excessively large torque from being transmitted from the driving rotation member to the driven rotation member.

To achieve the above object, the torsional vibration attenuation apparatus according to the present invention comprises a driving rotation member inputted with a rotational torque, a driven rotation member disposed in coaxial relationship with the driving rotation member to output the rotational torque of the driving rotation member, one or more resilient members each disposed between the driving rotation member and the driven rotation member to be resiliently deformed in the circumferential direction of the driving rotation member when the driving rotation member and the driven rotation member are relatively rotated with each other, a cam member provided on either one of the driving rotation member and the driven rotation member to be integrally rotated with either one of the driving rotation member and the driven rotation member and having a cam surface having an curvature varied in response to the variation of the torsion angle of the driving rotation member and the driven rotation member, and one or more arm members each having one end portion held in contact with the cam surface of the cam member and the other end portion held in engagement with the circumferential end portion of the resilient member and swingable around a swing fulcrum portion provided on either one of the driving rotation member and the driven rotation member, and the cam member and the one end portion of the arm member having respective sliding surfaces between which a roller element is provided.

The above torsional vibration attenuation apparatus is provided with a cam member having a cam surface with a curvature varied in response to the varied torsion angle of the driving rotation member and the driven rotation member, and a pair of arm members each intervening between the cam member and each of the resilient members, so that the one end portions of the arm members can slide along the cam surface of the cam member through the roller elements to enable the cam member to urge the resilient members through the arm members when the driving rotation member and the driven rotation member are relatively rotated with each other.

When the torsion angle of the driving rotation member and the driven rotation member is at a small level, the arm member press the cam member by the reaction of the resilient member resiliently deformed, thereby making it possible to transmit the rotational torque from the driving rotation member to the driven rotation member.

If the curvature of the cam surface is increased in response to the increased torsion angle of the driving rotation member and the driven rotation member, the resilient deformation amount of the resilient member can be increased, so that the arm member can strongly press the cam member to enable the rotational torque to be transmitted to the driven rotation member from the driving rotation member.

At this time, the increased resilient deformation amount of the resilient member leads to the increased contact pressure of the one end portion of the arm member and the cam member, thereby likely causing the contact surfaces of the arm member and the cam member to be abraded.

In contrast, the above torsional vibration attenuation apparatus according to the present invention is constructed to have one end portion of the arm member slideable on the cam surface of the cam member through the roller element, thereby making it possible to prevent the contact pressure of the one end portion of the arm member and the cam member from being heightened, and thereby to suppress the one end portion of the arm member and the cam member from being abraded.

As previously mentioned, the cam member can press the resilient member through the arm member in response to the rotation of the cam member to enable the reaction force of the resilient member to be varied to the arm member, so that the range of the torsion angle of the driving rotation member and the driven rotation member can be widened, thereby making it possible to make low as a whole the torsional rigidity of the driving rotation member and the driven rotation member.

As consequence, the torsional vibrations originated from the rotational fluctuation in response to the torque fluctuation of the driving source and the torsional resonance of the driving system can be attenuated, thereby making it possible to suppress the chinking noises caused by the collisions of the slipping gear pairs of the transmission gear sets and the muffled noises caused by the torsional resonance of the driving system.

Further, the torsional property can be in the non-linear shape, but is not multi-staged to have stepped portions as seen in the conventional torsional vibration attenuation apparatus, thereby making it possible to prevent the abrupt torque fluctuation from being generated, and to suppress the rattling noises from being generated.

When the driving rotation member and the driven rotation member are relatively rotated with each other with the excessively large torque inputted into the driving rotation member, the arm member can climb over the curvature maximum apex portion of the cam surface, so that the driving rotation member can slip with respect to the driven rotation member, thereby making it possible to have the cam member function as a torque limiter. As a consequence, the excessively large torque can be prevented from being transmitted from the driving rotation member to the driven rotation member, thereby making it possible to protect the transmission gear sets.

The roller element may preferably be rotatably supported on the one end portion of the arm member according to the present invention.

The above torsional vibration attenuation apparatus according to the present invention is constructed to have one end portion of the arm member slidable on the whole cam surface of the cam member through the roller element, thereby making it possible to prevent the contact pressure of the one end portion of the arm member and the cam member from being heightened, and thereby to suppress the one end portion of the arm member and the cam member from being abraded.

The roller element may preferably be rotatably supported on the cam member at a surface position with which the one end portion of the arm member is engaged when the driving rotation member and the driven rotation member take an maximum torsion set angle according to the present invention.

The above torsional vibration attenuation apparatus is constructed to have the roller element provided on the cam surface of the cam member where the contact pressure of the one end portion of the arm member and the cam member is at a maximum level, thereby making it possible to prevent the contact pressure of the one end portion of the arm member and the cam member from being heightened, and thereby to suppress the one end portion of the arm member and the cam member from being abraded.

Here, the sections of the cam surface to be held in engagement with the one end portions of the arm members when the torsion set angle of the driving rotation member and the driven rotation member each takes a maximum value indicate the apex portions to be held in engagement with the one end portions of the arm members when the driving rotation member and the driven rotation member are relatively rotated with each other and each having a largest curvature.

The curvature of the cam surface of the cam member may preferably be increased as the torsion angle is increased from the initial position of the cam member where the driving rotation member and the driven rotation member take a minimum torsion angle according to the present invention.

The above torsional vibration attenuation apparatus is constructed to make variable the curvature of the cam surface of the cam member contacted with the arm member in response to the varied torsion angle of the driving rotation member and the driven rotation member, thereby making it possible to widen the range of the torsion angle of the driving rotation member and the driven rotation member, and thereby to lower the torsional rigidity. Further, the torsional property of the driving rotation member and the driven rotation member can be made in a non-linear shape, thereby making it possible to prevent the abrupt torque fluctuation from being generated.

Further, the torsional rigidity of the driving rotation member and the driven rotation member can be increased in response to the increased torsion angle of the driving rotation member and the driven rotation member, so that the above torsional vibration attenuation apparatus can smoothly transmit the rotational torque from the driving rotation member to the driven rotation member while attenuating the large torque fluctuation by the resilient member.

The one end portion of the arm member is slidable with the cam surface of the cam member through the roller elements even if the curvature of the cam surface of the cam member contacted with the arm member is increased in response to the varied torsional angle of the driving rotation member and the driven rotation member, so that the above torsional vibration attenuation apparatus can prevent the contact pressure of the one end portion of the arm member and the cam member from being heightened, and thereby to suppress the one end portion of the arm member and the cam member from being abraded.

The torsional vibration attenuation apparatus may preferably further comprise two or more arm members which are disposed in point symmetrical relationship with each other across the center axis of the driving rotation member according to the present invention:

The torsional vibration attenuation apparatus is constructed to have the arm members disposed in point symmetrical relationship with the center axis of the driving rotation member, so that the arm members can sandwich and support the cam member across the center axis of the driving rotation member.

For this reason, the arm members can sandwich and support the cam member under a strong pressuring force across the center axis of the driving rotation member by the reaction of the resilient member when the resilient members are urged by the cam members through the arm members. As a result, the rotational torque can reliably be transmitted from the driving rotation member to the driven rotation member. The rotational torque can therefore be reliably transmitted from the driving rotation member to the driven rotation member, thereby making it possible to reliably integrally rotate the driving rotation member and the driven rotation member.

The driven rotation member may preferably be provided with a first rotation member having an outer peripheral portion constituting the cam member, and an inner peripheral portion drivably connected with the input shaft of a transmission, and the driving rotation member may preferably be provided with a pair of second rotation members disposed between both the axial sides of the first rotation member and axially spaced apart at a predetermined interval with each other and fastened to each other, each of the second rotation members being formed with a pair of accommodation portions each accommodating therein the resilient member, and a pair of retaining members retaining both of the circumferential end portions of the resilient member to have the resilient member supported on the both of circumferential end portions of the accommodation portion, the other end portion of the arm member having a roller element and being held in engagement with one of the pair of the retaining members through the roller element.

The above torsional vibration attenuation apparatus is constructed to have a pair of second rotation members each formed with the accommodation portion accommodating therein the resilient member, and a pair of retaining members respectively retaining the both circumferential end portions of the resilient member, the other end portion of the arm member having a roller element and being held in engagement with the circumferential one portion of the resilient member through the roller element and one of the pair of the retaining members, so that the torsional vibration attenuation apparatus can widen the range of the torsion angle of the driving rotation member and the driven rotation member, and can lower the torsional rigidity, as well as can make the torsional property in the non-linear shape, and can transmit the rotational torque to the driven rotation member from the driving rotation member.

In the conventional torsional vibration attenuation apparatus, the other end portion of the arm member is moved radially inwardly of the driving rotation member. In contrast, the torsional vibration attenuation apparatus according to the present invention is constructed to have the arm member has the other end engaged with one of the retaining member through the roller element, so that the other end portion of the arm member can resiliently deform the resilient member circumferentially of the driving rotation member while the other end portion of the arm member is sliding radially and smoothly along the engagement surface of one of the retaining members.

The above torsional vibration attenuation apparatus may further comprise a hysteresis mechanism intervening between the cam member and the second rotation member to have the cam member and the second rotation member held in friction contact with each other according to the present invention.

The above torsional vibration attenuation apparatus is constructed to have the hysteresis mechanism intervening between the cam member and the second rotation member, so that the torsional vibration attenuation apparatus can increase the hysteresis torque between the cam member and the second rotation member when the torsion angle between the cam member and the second rotation member is increased, thereby making it possible to even further suppress the muffled noises and the chinking noises caused by the torsional resonance of the driving system.

Advantageous Effects of Invention

The torsional vibration attenuation apparatus according to the present invention can obtain a non-linear torsional property while widening the range of the torsion angle of the driving rotation member and the driven rotation member, and can prevent the excessively large torque from being transmitted from the driving rotation member to the driven rotation member.

BRIEF DESCRIPTION OF DRAWINGS

FIG. 8 is view showing one preferred embodiment of the torsional vibration attenuation apparatus according to the present invention.

FIG. 9 is view showing one preferred embodiment of the torsional vibration attenuation apparatus according to the present invention.

DESCRIPTION OF EMBODIMENTS

The preferred embodiment of the torsional vibration attenuation apparatus according to the present invention will be described hereinafter with reference to the accompanying drawings.

FIGS. 1 to 16 are views showing one preferred embodiment of the present invention.

First, the construction of the embodiment of the torsional vibration attenuation apparatus according to the present embodiment will be explained hereinafter.

Figure 1:
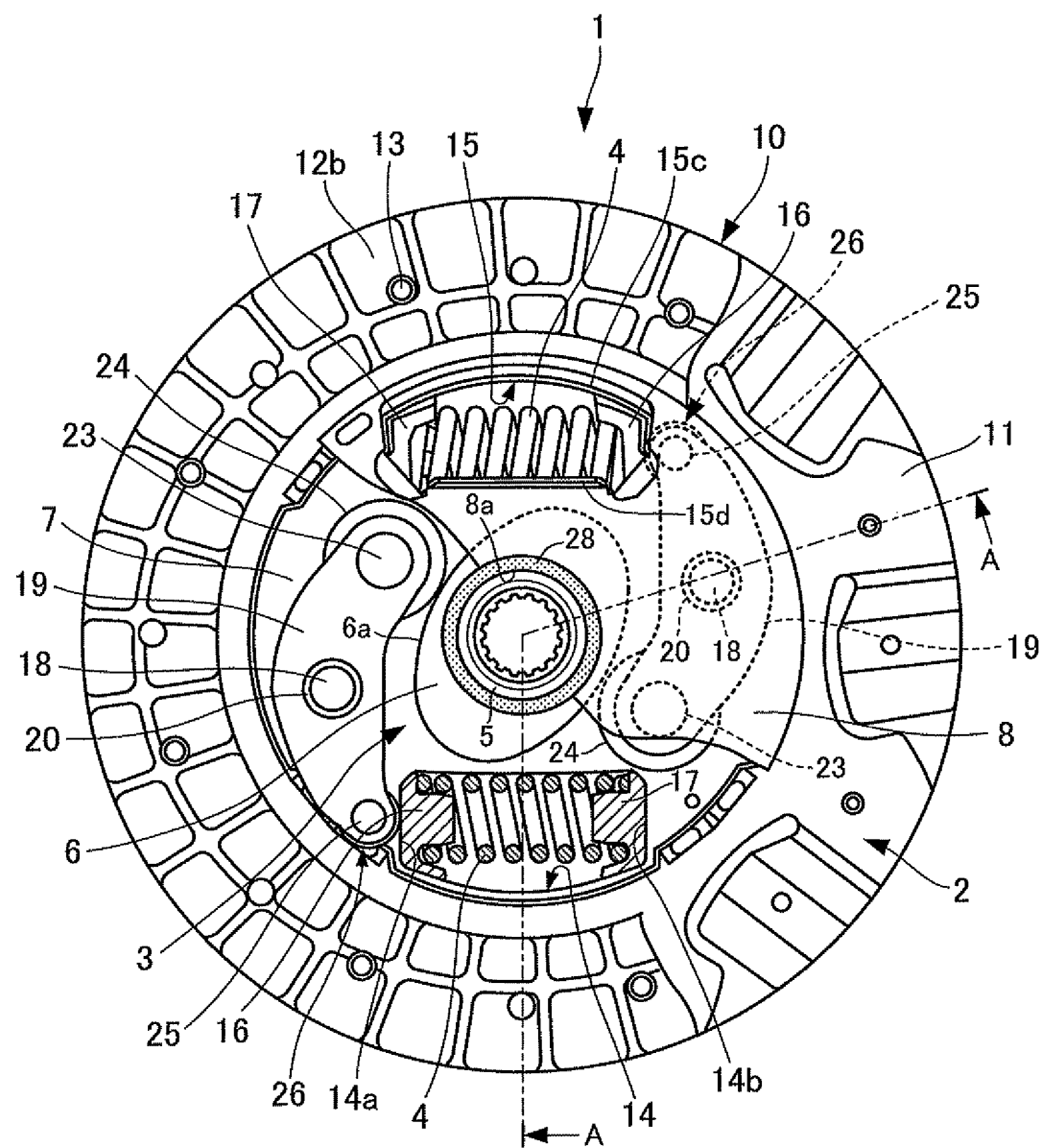
FIG. 1 is a view showing one preferred embodiment of a torsional vibration attenuation apparatus according to the present invention, and a front view of the torsional vibration attenuation apparatus.
Figure 2:
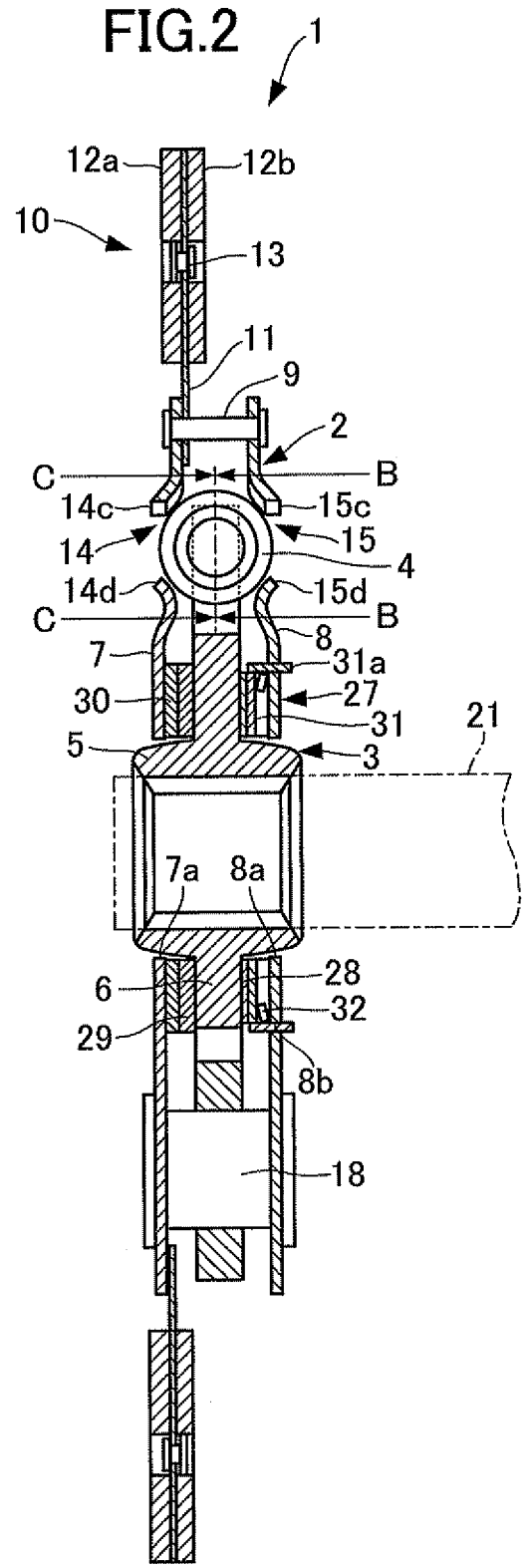
FIG. 2 is a view showing one preferred embodiment of the torsional vibration attenuation apparatus according to the present invention, and a cross-sectional view taken along the chain line and seen from the arrows A-A in FIG. 1.

The torsional vibration attenuation apparatus 1 is shown in FIGS. 1 and 2 to comprise a driving rotation member 2 inputted with a rotational torque from an internal combustion engine not shown but constituting a drive source, and a driven rotation member 3 disposed in coaxial relationship with the driving rotation member 2 to output and transmit the rotational torque of the driving rotation member 2 to a transmission forming part of a drive system not shown, a pair of resilient members constituted by a pair of coil springs 4 disposed between the driving rotation member 2 and the driven rotation member 3 to be capable of being compressed, viz., resiliently deformed in the circumferential direction of the driving rotation member 2 when the driving rotation member 2 and the driven rotation member 3 are relatively rotated with each other.

The driven rotation member 3 is constituted by a boss 5 constituting a first rotation member held in splined engagement with the outer peripheral portion of the input shaft 21 of the transmission of the drive system, and a cam member 6 provided on the outer peripheral portion of the boss 5.

Here, the boss 5 and the cam member 6 may be integrally formed. Further, the boss 5 and the can member 6 may be separately formed with the peripheral portion of the boss 5 having a splined portion and with the peripheral portion of the cam member 6 having a splined portion, the splined portion of the peripheral portion of the boss 5 being held in splined connection with the splined portion of the peripheral portion of the cam member 6.

The driving rotation member 2 is provided with a pair of disc plates 7, 8 and a clutch disc 10 constituting in combination a second rotation member. The disc plates 7, 8 are respectively disposed at the axial both sides of the boss 5 and spaced apart at a predetermined axial interval and connected with each other by a pin 9 and a pin 18 serving as a swinging fulcrum portion.

The disc plates 7, 8 have a cylindrical central bores 7a, 8a respectively formed therein to receive the boss 5, so that the boss 5 is in coaxial relationship with the disc plates 7, 8.

The pins 9, 18 are bridged between and are supported on the disc plates 7, 8, and the disc plates 7, 8 can be reliably fastened with each other by the pins 9, 18 in such a manner that the pins 9, 18 respectively have axially outer ends each having a large diameter to prevent the pins 9, 18 from being released from the disc plates 7, 8. This means that the disc plates 7, 8 are integrally connected with each other, and thus can be rotated together with each other.

The clutch disc 10 is provided at the radially outer end portion of the disc plate 7, and has a cushioning plate 11 and friction materials 12a, 12b. The cushioning plate 11 is constituted by a ring-shaped member waved in its thickness direction, and is secured to the disc plates 7, 8 by the pins 9.

The friction materials 12a, 12b are secured to the both surfaces of the cushioning plate 11 by rivets 13. The friction materials 12a, 12b are positioned between a flywheel not shown but secured to a crankshaft forming part of an internal combustion engine and a pressure plate of a clutch cover secured to the flywheel by bolts.

The friction material 12a, 12b are pressurized by the pressure plate to be brought into frictional engagement with the flywheel and the pressure plate, so that the rotational torque of the internal combustion engine can be inputted to the disc plates 7, 8.

In response to the depression of a clutch pedal not shown, the friction materials 12a, 12b are released from being pressurized by the pressure plate, thereby allowing the friction materials 12a, 12b to be spaced apart from the flywheel, so that the rotational torque of the internal combustion engine cannot be inputted to the disc plates 7, 8.

The disc plates 7, 8 are respectively formed with a pair of accommodation window holes.14, 15 respectively constituting accommodation portions and circumferentially spaced apart from each other. The accommodation window holes 14, 15 are in opposing relationship with each other in the axial direction of the disc plates 7, 8 and respectively adapted to receive the coil springs 4.

The accommodation window holes 14, 15 are formed by punching along the outer peripheral portions of the coil springs 4 with a press machine, and are respectively closed at their both circumferential ends in the circumferential direction of the disc plates 7, 8.

Figure 3:
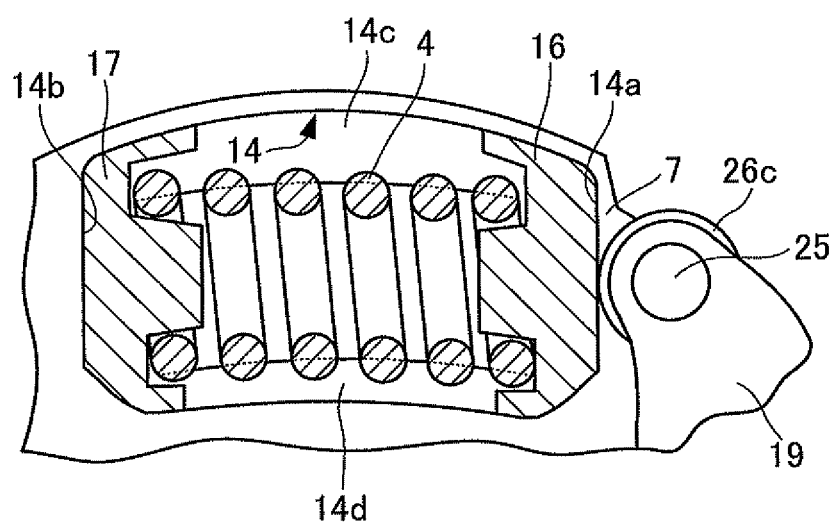
FIG. 3 is a view showing one preferred embodiment of the torsional vibration attenuation apparatus according to the present invention, and a fragmentally cross-sectional view taken along the chain line and seen from the arrows B-B in FIG. 2.
Figure 4:
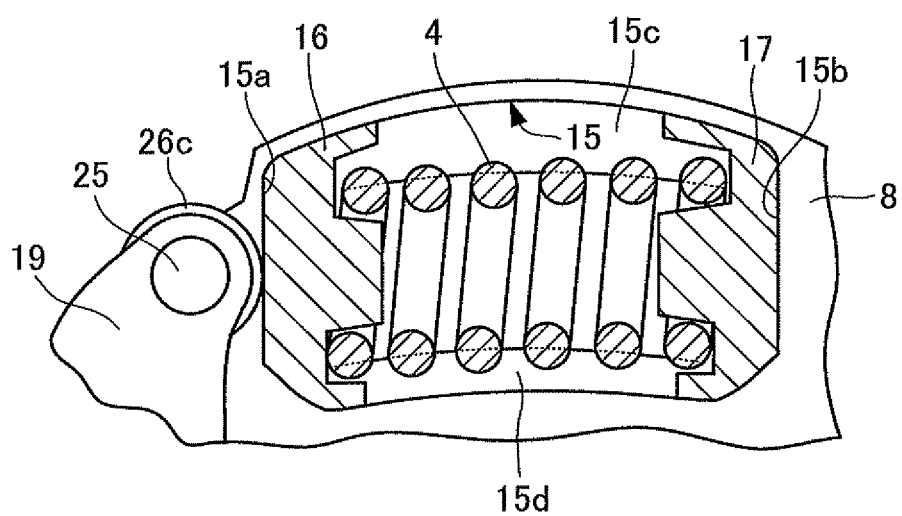
FIG. 4 is a view showing one preferred embodiment of the torsional vibration attenuation apparatus according to the present invention, and a fragmentally cross-sectional view taken along the chain line and seen from the arrows C-C in FIG. 2.

As shown in FIGS. 2 to 4, the disc plates 7, 8 have respective outer support edge portions (accommodation portions) 14c, 15c circumferentially extending along the radially outer edges of the accommodation window holes 14 and respective inner support edge portions (accommodation portions) 14d, 15d circumferentially extending along the radially inner edge of the accommodation window holes 14. The outer support edge portions 14c, 15c and the inner support edge portions 14d, 15d expand axially outwardly.

Each of the coil springs 4 is retained at its circumferential both end portions by a pair of spring seats 16, 17 constituting a pair of retaining members as defined in the present invention. The spring seats 16, 17 respectively have inner peripheral surfaces each formed with an end coil.

The end coils are corresponding to one or two turns of the circumferential both end portions of the coil springs 4, and allow the circumferential both end portions of the coil springs 4 to seat thereon, so that the beginning end and the terminal end in the winding direction of the coil springs 4 can be engaged with the coil ends, thereby making it possible to prevent the coil springs 4 from being rotated and to have the coil spring 4 seated on the spring seats 16, 17.

As shown in FIGS. 3, 4, the closed ends at the circumferential both ends of the disc plates 7, 8 constitute engagement portions 14a, 14b, 15a, 15b held in engagement with the circumferential end portions of the spring seats 16, 17, so that the circumferential end portions of the spring seats 16, 17 are engaged with the engagement portions 14a, 14b, 15a, 15b when the spring seats 16, 17 are circumferentially moved farthest away from each other.

The outer peripheral portions of the spring seats 16, 17 are in opposing relationship with the outer support edge portions 14c, 15c and the inner support edge portions 14d, 15d, and prevented from being dislocated from the accommodation window holes 14, 15 by the outer support edge portions 14c, 15c and the inner support edge portions 14d, 15d.

Between the circumferential one of the spring seats 16 and the cam member 6 is provided an arm member 19 which is disposed between the disc plates 7, 8 and swingably supported on the pin 18.

Between the spring seats 16 and the cam member 6 are provided a pair of arm members 19 which are disposed between the disc plates 7, 8 and swingably supported on the pin 18.

Figure 6:
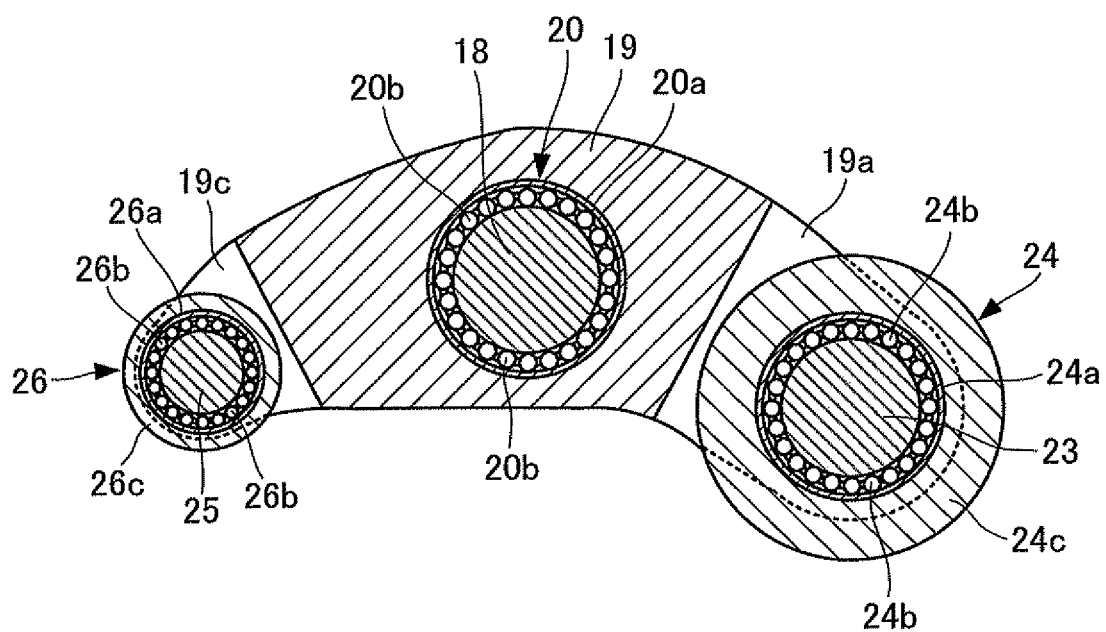
FIG. 6 is a view showing one preferred embodiment of the torsional vibration attenuation apparatus according to the present invention, and a cross-sectional view taken along the chain line and seen from the arrows D-D in FIG. 5.
Figure 7:
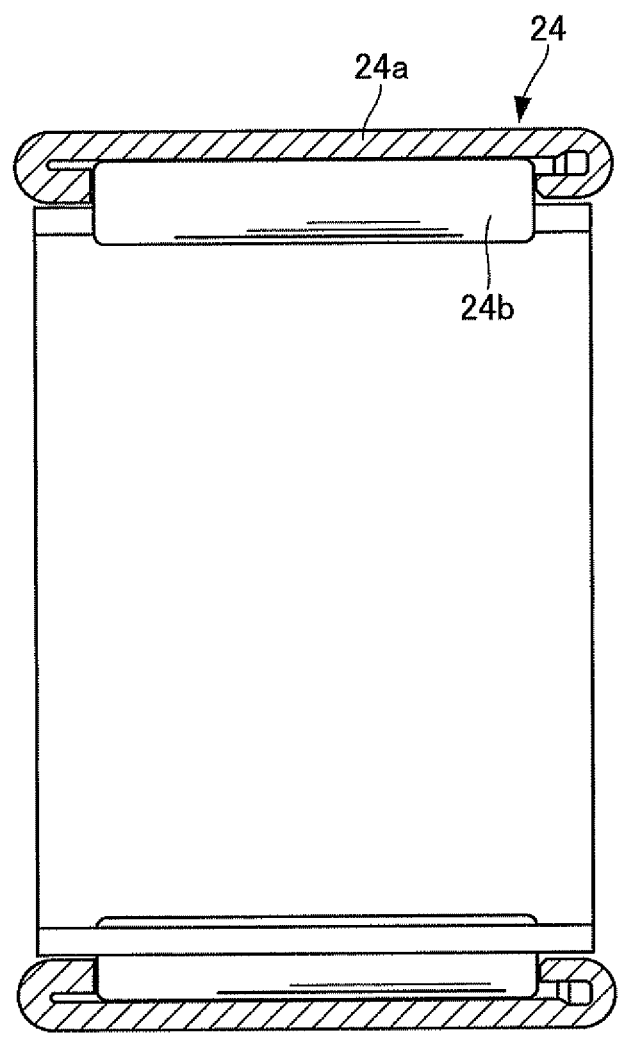
FIG. 7 is a view showing one preferred embodiment of the torsional vibration attenuation apparatus according to the present invention, and a partly cross-sectional view of a needle bearing forming part of the torsional vibration attenuation apparatus.

A needle bearing 20 intervenes between the pin 18 and the arm member 19. As shown in FIG. 6, the needle bearing 20 is constituted by an outer race 20a securely mounted on the arm member 19, and needles 20b intervening between the outer race 20a and the pin 18. For this reason, the arm member 19 is rotatable with respect to the pin 18 and supported on the pin 18 through the needle bearing 20.

Figure 5:
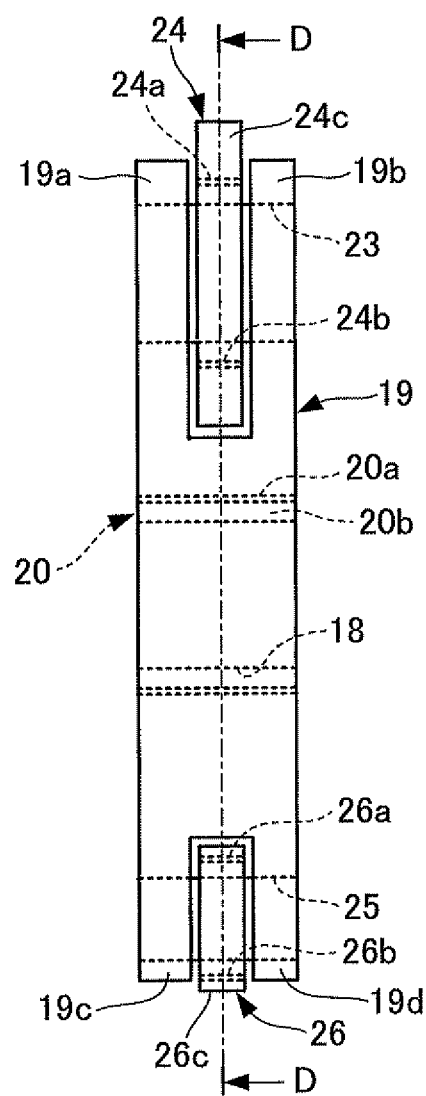
FIG. 5 is a view showing one preferred embodiment of the torsional vibration attenuation apparatus according to the present invention, and a plan view of an arm member forming part of the torsional vibration attenuation apparatus.

As shown in FIG. 5, the arm member 19 has one end portion formed with bifurcated projection portions 19a, 19b which are connected with each other by a pin 23. In other words, the pin 23 is supported on the projection portions 19a, 19b.

The pin 23 has a roller member 24 rotatably supported thereon. The roller member 24 constitutes a roller element as defined in the present invention. As shown in FIG. 6, the roller member 24 is constituted by an outer race 24a provided on the outer peripheral portion of the pin 23, a needle bearing constituted by needles 24b intervening between the outer race 24a and the pin 23 (see FIG. 7), and a roller 24c securely mounted on the outer peripheral portion of the outer race 24a, so that the roller 24c is rotatable with respect the pin 23 through the needle bearing.

The roller 24c is adapted to be rotated in contact with the cam surface 6a of the cam member 6, so that the one end portion of the arm member 19 is engaged with the cam surface 6a of the cam member 6 through the roller 24c.

As shown in FIG. 6, the other end portion of the arm member 19 is formed with bifurcated projection portions 19c, 19d which are connected with each other by a pin 25, so that the projection portions 19c, 19d are connected with each other through the pin 25. In other words, the pin 25 is supported on the projection portions 19c, 19d.

The pin 25 has a roller member 26 rotatably supported thereon. The roller member 26 constitutes a roller element as defined in the present invention. The roller member 26 is constituted by an outer race 26a provided on the outer peripheral portion of the pin 25, a needle bearing constituted by needles 26b intervening between the outer race 26a and the pin 25, and a roller 26c securely mounted on the outer peripheral portion of the outer race 26a, so that the roller 26c is rotatable with respect to the pin 25 and supported on the pin 25 through the needle bearing.

The roller 26e is adapted to be engaged with the circumferential outer surface of the spring seats 16, so that the other end portion of the arm member 19 is engaged with the circumferential outer surface of the spring seats 16 through the roller 26c.

The cam member 6 has a cam surface 6a with a curvature varied in response to the varied torsion angle of the disc plates 7, 8 and the boss 5. In the present embodiment, the cam member 6 has an elliptical cam surface 6a whose curvature is increased as the torsion angle of the disc plates 7, 8 and the boss 5 is increased from the initial position of the cam member 6 where the torsion angle of the disc plates 7, 8 and the boss 5 is at a minimum level.

Therefore, the initial position of the cam member 6 is adapted to be set to have the roller 24c of the arm member 19 engaged with the cam surface 6a small in curvature when the torsion angle of the disc plates 7, 8 and the boss 5 is at a minimum level.

For this reason, the position of the cam surface 6a held in engagement with the roller 24c of the arm member 19 when the cam member 6 is rotated is varied, thereby making it possible to have the spring seat 16 urged by the arm member 19 to allow the compression amount of the coil springs 4 to be varied. At this time, the spring seats 16 is moved toward and away from the spring seat 17 along each of the peripheral edges of the accommodation window holes 14, 15.

The arm members 19 are arranged in point symmetrical relationship with each other with respect to the common center axis of the disc plates 7, 8. This means that the arm members 19 have respective one end portions which can be respectively held in contact with the cam surface 6a having the same curvatures across the common center axis of the disc plates 7, 8.

On the other hand, as shown in FIG. 2, a hysteresis mechanism 27 intervenes between the disc plates 7, 8 and the cam member 6, and is constituted by annular friction materials 28, 29, 30, 31 and a plate spring 32.

Each of the friction materials 28, 29 is constituted by a material having a surface with a predetermined coefficient of friction. The friction materials 28, 29 are adhered and fastened to the axial outer surfaces of the cam member 6 by an adhesive. Further, the friction materials 28, 29 may be fastened to the cam member 6 by providing pins integrally formed with the friction materials 28, 29, and fittingly engaged with pin holes formed on the axial outer peripheral portions of the cam member 6.

The friction material 30 is constituted by a material having a surface with a predetermined coefficient of friction. The friction material 30 is adhered and fastened to the inner peripheral surface of the disc plate 7 by an adhesive. Further, the friction material 30 may be firmly fastened to the disc plate 7 by providing pins integrally formed with the friction material 30, and fittingly engaged with pin holes formed on the inner peripheral portion of the disc plate 7.

Figure 8A:
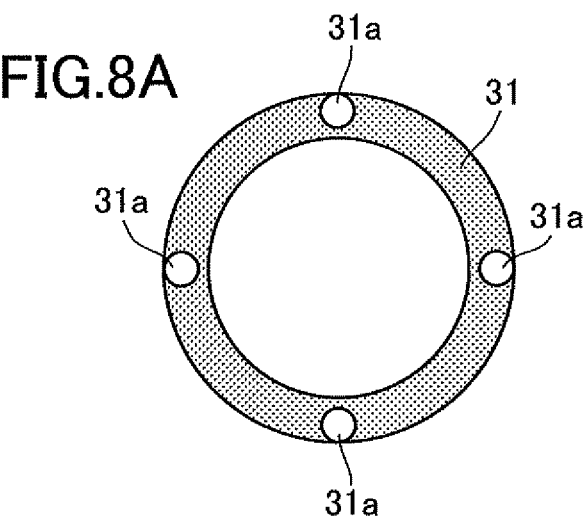
FIG. 8(a) is a front view of a friction material forming part of a hysteresis mechanism.
Figure 8B:
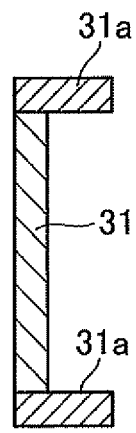
FIG. 8(b) is a side view of the friction material shown in FIG. 8(a).

As shown in FIG. 8, the friction material 31 is constituted by a material having a surface with a predetermined coefficient of friction. The friction material 31 has a radially outer peripheral surface integrally provided with a plurality of pins 31a. These pins 31a are fittingly engaged with pin holes 8b formed on the inner peripheral portion of the disc plate 8, so that the friction material 31 can be firmly fastened to the inner surface of the disc plate 8.

Figure 9A:
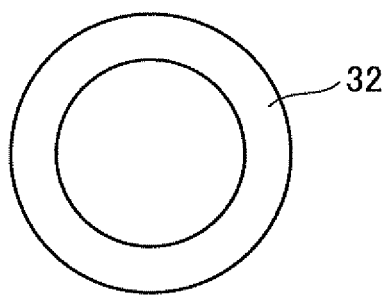
FIG. 9(a) is a front view of a plate spring forming part of the hysteresis mechanism.
Figure 9B:
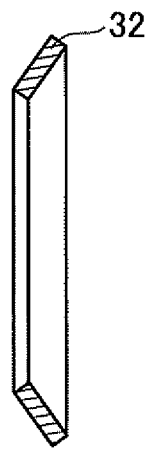
FIG. 9(b) is a cross-sectional view of the plate spring shown in FIG. 9(a).
Figure 10:
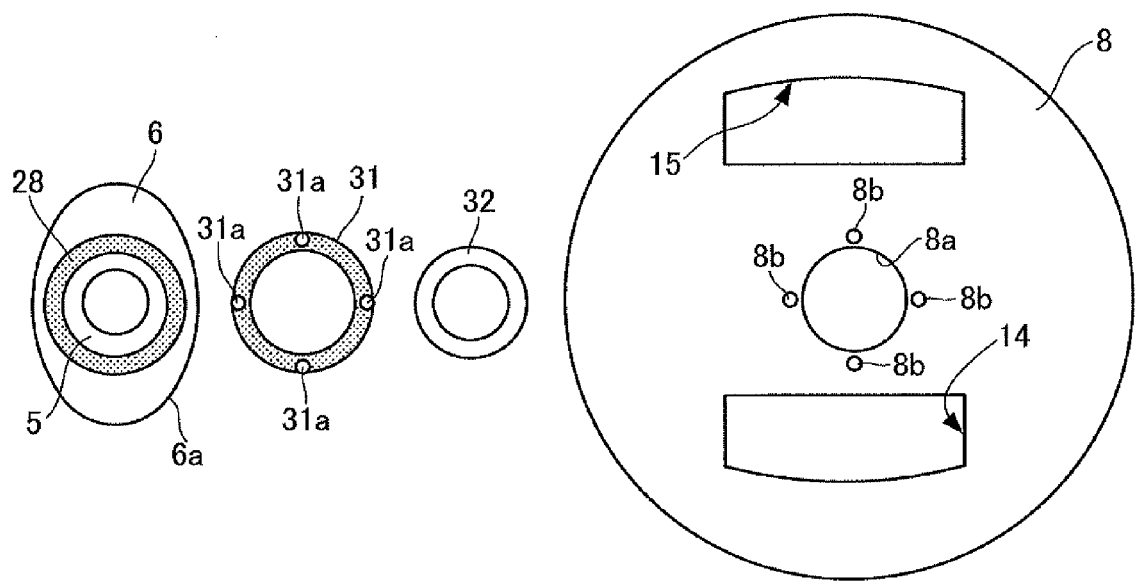
FIG. 10 is a view showing one preferred embodiment of the torsional vibration attenuation apparatus according to the present invention, and an exploded view of the hysteresis mechanism.

As shown in FIGS. 9 and 10, the plate spring 32 is in a conical shape, and intervenes between the friction material 31 and the disc plate 8.

The plate spring 32 is capable of generating a resilient force in the axial direction of the cam member 6 to have the friction material 31 and the friction material 28 held in frictional contact with each other, and to have the friction material 29 and the friction material 30 also held in frictional contact with each other, so that the cam member 6 and the disc plates 7, 8 are held in frictional contact with each other, thereby generating a hysteresis torque between the cam member 6 and the disc plates 7, 8.

Further, the hysteresis mechanism may be constructed to have the friction materials 30, 31 held in direct frictional contact with the axial outer peripheral surfaces of the cam member 6 without using the friction materials 28, 29.

Next, the operation of the torsional vibration attenuation apparatus 1 according to the present embodiment will be described hereinafter.

Figure 11:
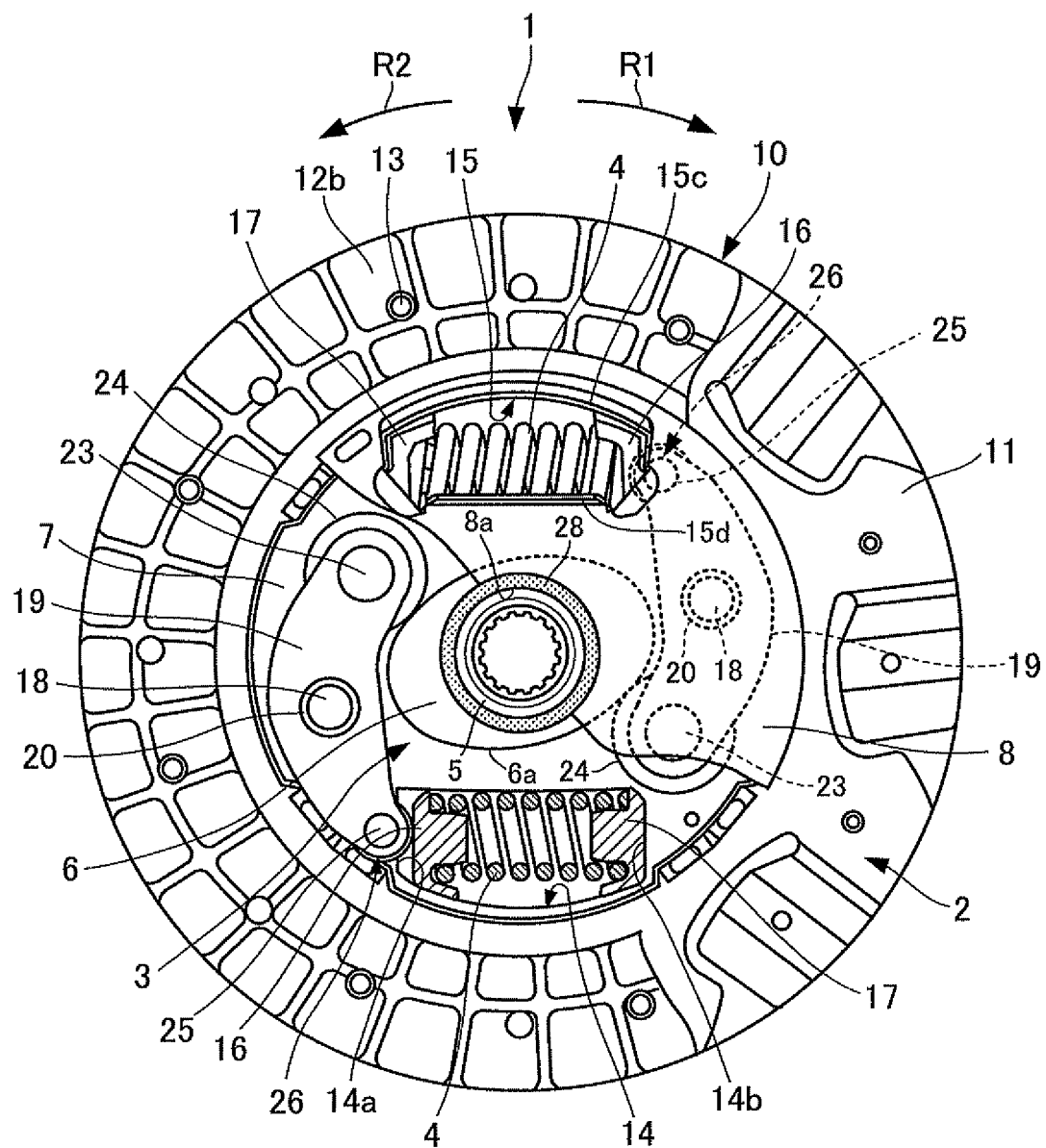
FIG. 11 is a view showing one preferred embodiment of the torsional vibration attenuation apparatus according to the present invention, and a front view of the torsional vibration attenuation apparatus with the torsion angle of the disc plates and the boss being +45 degrees.
Figure 12:
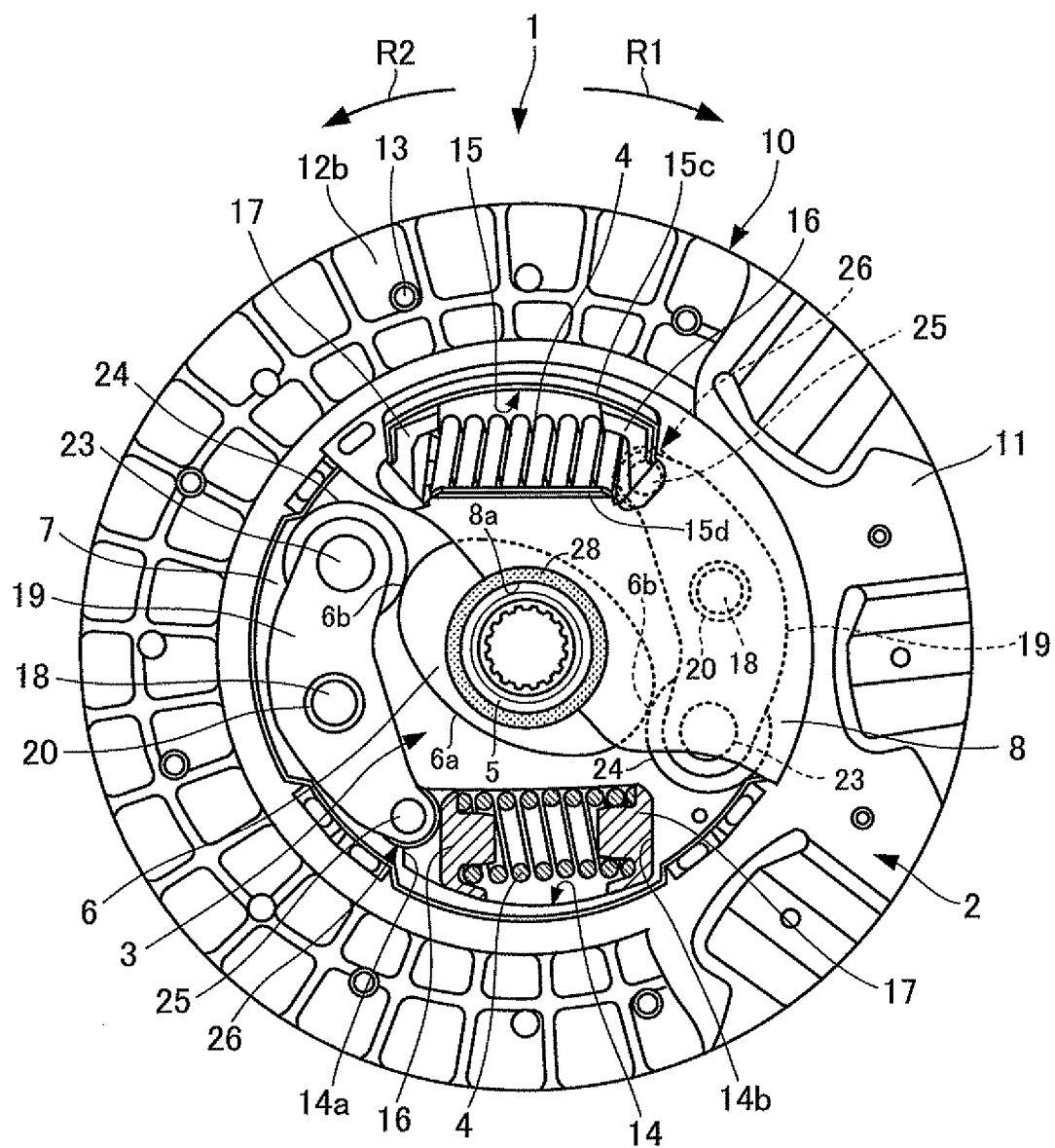
FIG. 12 is a view showing one preferred embodiment of the torsional vibration attenuation apparatus according to the present invention, and a front view of the torsional vibration attenuation apparatus with the torsion angle of the disc plates and the boss being +90 degrees.

FIGS. 11 and 12 show the states in which the disc plates 7, 8 receive the rotational torques from the internal combustion engine to be rotated in the anti-clockwise direction (R2 direction) from the state shown in FIG. 1. For the sake of convenience of explanation, the boss 5 will be explained as being twisted in a positive clockwise direction (R1 direction) with respect to the disc plates 7, 8. Here, the state of the boss 5 twisted in the positive clockwise direction indicates a time when the vehicle is being accelerated.

The friction materials 12a, 12b are pressed by the pressure plate to be brought into frictional engagement with the flywheel and the pressure plate, so that the rotational torque of the internal combustion engine is inputted to the disc plates 7, 8.

The torsional vibration attenuation apparatus 1 according to the present embodiment is, as shown in FIG. 1, operated to have the cam member 6 positioned at its initial position and rotated together with the boss 5 in the state that the disc plates 7, 8 and the boss 5 are rotated under a small relative rotation, viz., at a small torsion angle of the disc plates 7, 8 and the boss 5 in the vicinity of zero degree.

At this time, the roller 24c of the arm member 19 is held in contact with the cam surface 6a small in curvature of the cam member 6, so that the arm member 19 is pressed against the coil spring seats 16 by the cam member 6, thereby allowing the cam member 6 to urge the coil springs 4.

Further at this time, the arm member 19 is pivoted by the reaction force of the coil spring 4 around the pin 18 serving as a fulcrum under the principle of the lever to press the can member 6. This means that the rotational torque of the disc plates 7, 8 is transmitted to the cam member 6 through the coil springs 4 and the arm member 19. For this reason, the rotational torque of the internal combustion engine is transmitted to the input shaft of the transmission. At this time, the compression amount of the coil springs 4 becomes small.

Therefore, the torsional vibrations of the disc plates 7, 8 and the boss 5 can be absorbed and attenuated while the power of the internal combustion engine is being transmitted from the disc plates 7, 8 to the boss 5.

When, on the other hand, there is caused a small rotational fluctuation by the torque fluctuation of the internal combustion engine at the acceleration time of the vehicle, the fluctuation torque between the disc plates 7, 8 and the boss 5 is small, whereupon the boss 5 is relatively rotated with respect to the disc plates 7, 8 in the clockwise direction (R1 direction).

When the cam member 6 is rotated in the R1 direction in response to the increased torsion angle of the disc plates 7, 8 and the boss 5 as in the state shown in FIG. 11 from the state shown in FIG. 1, the roller 24c of the arm member 19 rolls along the cam surface 6a. This means that the one end portion of the arm member 19 slides on the cam surface 6a through the roller 24c.

The curvature of the cam surface 6a is increased as the torsion angle of the disc plates 7, 8 and the boss 5 is increased from when the cam member 6 is at its initial position, so that when the one end portion of the arm member 19 is pressed against the cam surface 6a of the cam member 6 having the curvature gradually increased through the roller 24c, the other end portion of the arm member 19 is moved radially inwardly and circumferentially of the disc plates 7, 8.

In response to the rotation of the cam member 6 in the R1 direction, the other end portion of the arm member 19 is moved radially inwardly of the disc plates 7, 8, thereby allowing the spring seat 16 to be moved toward the spring seat 17.

The other end portion of the arm member 19 moved along the circumferential outer peripheral surface of the spring seat 16 through the roller 26c makes it possible for the spring seat 16 not to be prevented from being circumferentially moved. Here, the torsion angle of the disc plates 7, 8 and the boss 5 is shown as being +45 degrees in FIG. 11.

This means that, as shown in FIGS. 3 and 4, the circumferential one portion of the spring seat 17 is held in engagement with each of the engagement portions 14b, 15b, so that the spring seat 16 is moved toward the spring seat 17 along each of the peripheral edges of the accommodation window holes 14, 15 to compress the coil spring s 4.

As previously mentioned, the arm member 19 is moved to urge the coil springs 4, thereby causing the arm member 19 to be pivoted by the reaction force of the coil springs 4 around the pin 18 serving as the fulcrum under the principle of the lever to press the cam member 6 with a strong pressing force.

Therefore, the torsional vibrations of the disc plates 7, 8 and the boss 5 can be absorbed and attenuated while the power of the internal combustion engine is being transmitted from the disc plates 7, 8 to the boss 5.

When there is caused a further large rotational fluctuation by the torque fluctuation of the internal combustion engine, the fluctuation torque between the disc plates 7, 8 and the boss 5 is increased, whereupon the boss 5 is further relatively rotated with respect to the disc plates 7, 8 in the clockwise direction (R1 direction).

When the torsion angle of the disc plates 7, 8 and the boss 5 is increased for example to a maximum of +90 degrees as in the state shown in FIG. 12 from the state shown in FIG. 11, the roller 24c of the arm member 19 is positioned at the apex portion 6b having a maximum curvature of the cam surface 6a, thereby allowing the cam member 6 to urge the coil spring 4 with a larger urging force through the arm member 19.

This results in the fact that, the reaction force of the coil springs 4 is more increased, so that the torsional vibrations of the disc plates 7, 8 and the boss 5 can be absorbed and attenuated while the power of the internal combustion engine is being transmitted from the disc plates 7, 8 to the boss 5.

In this case, the curvature of the cam surface 6a is increased as the torsion angle of the disc plates 7, 8 and the boss 5 is increased from when the cam member 6 is at its initial position, so that when the one end portion of the arm member 19 is pressed against the cam surface 6a of the cam member 6 having the curvature gradually increased through the roller 24c, the other end portion of the arm member 19 is moved radially inwardly of the disc plates 7, 8.

Also in this case, the other end portion of the arm member 19 moved along the circumferential outer peripheral surface of the spring seat 16 through the roller 26c makes it possible for the spring seat 16 not to be prevented from being circumferentially moved.

When the disc plates 7, 8 are inputted with the excessively large torque from the internal combustion engine, the roller 24e of the arm member 19 can climb over the curvature maximum apex portion 6b of the cam surface 6a to have the disc plates 7, 8 slip with respect to the cam member 6, thereby making it possible to have the cam member 6 function as a torque limiter at the acceleration time of the vehicle.

As a consequence, the excessively large torque from the disc plates 7, 8 is prevented from being transmitted to the boss 5, thereby making it possible to protect the transmission gear sets of the transmission.

Due to the fact that the hysteresis mechanism 27 intervenes between the disc plates 7, 8 and the cam member 6, a predetermined amount of hysteresis torque can be generated when the disc plates 7, 8 and the cam member 6 are relatively rotated with each other.

When, on the other hand, the driving torque of the internal combustion engine is diminished at the deceleration time of the vehicle, there is caused an engine brake, so that the rotational torque is transmitted from the input shaft 21 of the transmission to the boss 5. In the case that the rotational fluctuation caused by the torque fluctuation of the internal combustion engine at the deceleration time of the vehicle is at a small level, the fluctuation torque between the boss 5 and the disc plates 7, 8 is at a small level, so that the boss 5 is relatively twisted to a negative side (R2 direction) with respect to the disc plates 7, 8.

Figure 13:
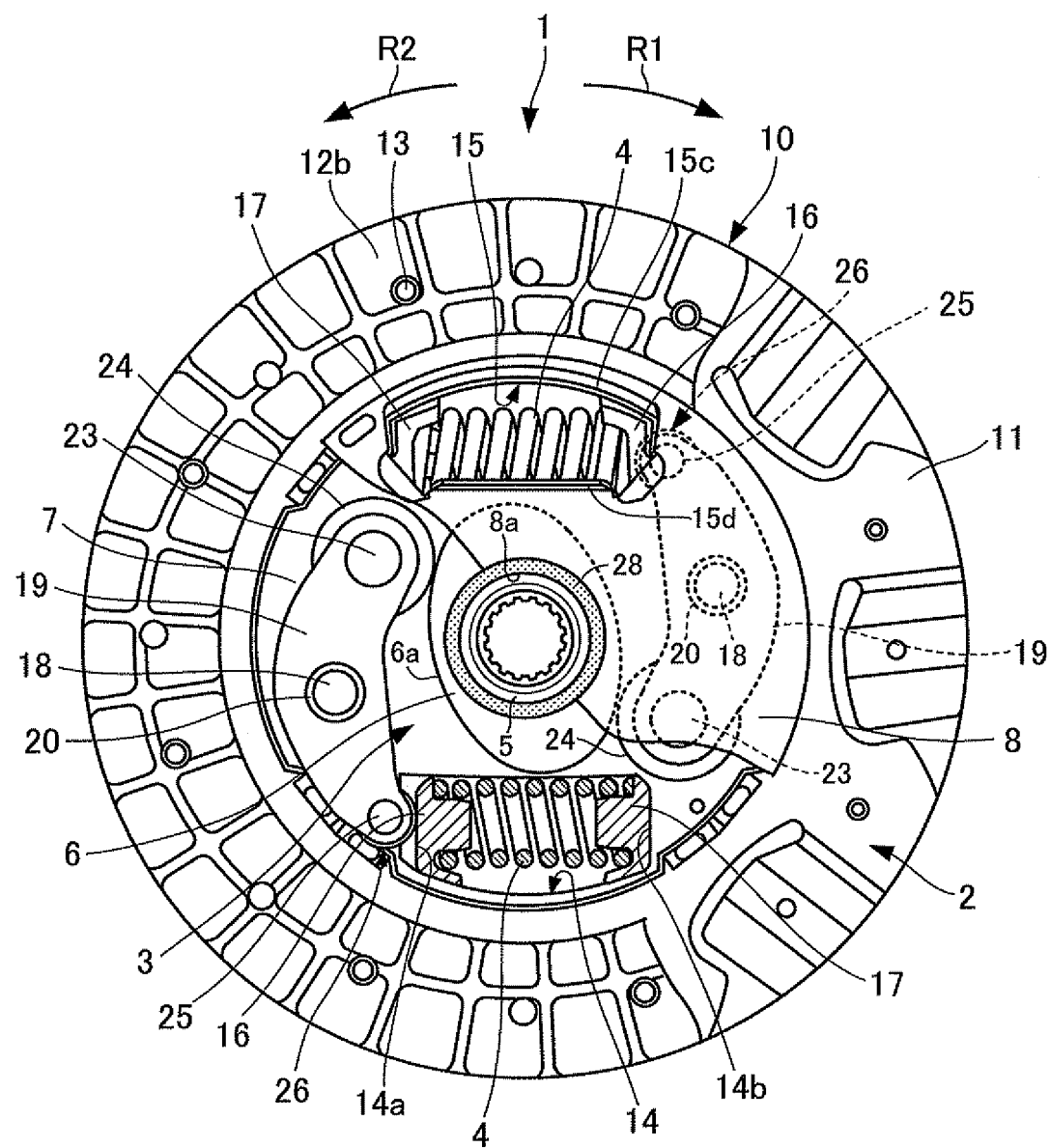
FIG. 13 is a view showing one preferred embodiment of the torsional vibration attenuation apparatus according to the present invention, and a front view of the torsional vibration attenuation apparatus with the torsion angle of the disc plates and the boss being −45 degrees.

When the disc plates 7, 8 and the boss 5 are relatively rotated with each other as indicated from the state shown in FIG. 1 to the state shown in FIG. 13 at this time, the cam member 6 is rotated as the distortion angle of the disc plates 7, 8 and the boss 5 is increased, so that the roller 24c of the arm member 19 rolls along the cam surface 6a. For this reason, the one end portion of the arm member 19 slides on the cam surface 6a through the roller 24c.

The curvature of the cam surface 6a is increased in response to the increased distortion angle of the disc plates 7, 8 and the boss 5 from the time when the cam member 6 takes its initial position, so that when the one end portion of the arm member 19 is pressed through the roller 24c against the cam surface 6a of the cam member 6 having the curvature gradually increased, the other end portion of the arm member 19 is moved radially inwardly and circumferentially.

In response to the rotation of the cam member 6 in the anti-clockwise direction (R2 direction), the other end portion of the arm member 19 is moved radially inwardly of the disc plates 7, 8, thereby causing the spring seat 16 to move toward the spring seat 17.

Also in this case, the other end portion of the arm member 19 moved along the circumferential outer peripheral surface of the spring seat 16 through the roller 26c makes it possible for the spring seat 16 not to be prevented from being circumferentially moved. Here, the torsion angle of the disc plates 7, 8 and the boss S is shown as being +45 degrees in FIG. 13.

This means that, as shown in FIGS. 3 and 4, the circumferential one portion of the spring seat 17 is held in engagement with each of the engagement portions 14b, 15b, so that the spring seat 16 is moved toward the spring seat 17 along each of the peripheral edges of the accommodation window holes 14, 15 to compress the coil spring 4.

As previously mentioned, the arm member 19 is operated to urge the coil springs 4, thereby causing the arm member 19 to be pivoted by the reaction force of the coil springs 4 around the pin 18 serving as the fulcrum under the principle of the lever to press the cam member 6 with a strong pressing force.

Therefore, the torsional vibrations of the disc plates 7, 8 and the boss 5 can be absorbed and attenuated while the power of the driving system is being transmitted to the disc plates 7, 8 from the boss 5.

When the boss 5 is further relatively rotated with respect to the disc plates 7, 8 in the negative side (R2 direction) to have the torsion angle of the disc plates 7, 8 and the boss 5 increased for example to a maximum of +90 degrees, the roller 24c of the arm member 19 is positioned at the apex portion 6b having a maximum curvature of the cam surface 6a, thereby allowing the cam member 6 to urge the coil springs 4 with a larger urging force through the arm member 19. This results in the fact that the reaction force of the coil springs 4 is further increased, so that the torsional vibrations of the disc plates 7, 8 and the boss 5 can be absorbed and attenuated while the power of the driving system is being transmitted to the disc plates 7, 8 from the boss 5.

When the boss 5 is inputted with the excessively large torque from the internal combustion engine through the disc plates 7, 8, the roller 24c of the arm member 19 can climb over the curvature maximum apex portion 6b of the cam surface 6a to have the cam member 6 slip with respect to the disc plates 7, 8, thereby making it possible to have the cam member 6 function as a torque limiter.

As a consequence, the excessively large torque from the disc plates 7, 8 is prevented from being transmitted to the boss 5 at the deceleration time of the vehicle, thereby making it possible to protect the transmission gear sets of the transmission.

Also at the deceleration time of the vehicle, a predetermined amount of hysteresis torque can be generated when the disc plates 7, 8 and the cam member 6 are relatively rotated with each other.

As has been described in the above, the torsional vibration attenuation apparatus 1 according to the present embodiment comprises a boss 5, a cam member 6 provided at the peripheral portion of the boss 5 and integrally rotated with the boss 5 and having an elliptical cam surface 6a, a pair of arm members 19 provided between the cam member 6 and a pair of coil springs 4, and each having one end portion held in contact with the cam surface 6a of the cam member 6 and the other end portion held in engagement with a spring seat 16 of the coil springs 4, the arm member 19 being swingable around a pin 18 extending between the disc plates 7, 8, and a roller member 24 provided between the one end portion of each of the arm members 19 and the cam surface 6a of the cam member 6.

This results in the fact that the range of the torsion angle of the disc plates 7, 8 and the boss 5 can be widened, thereby making it possible not only to reduce as a whole the torsional rigidity of the torsional vibration attenuation apparatus 1 but to make the torsion property in a non-linear form. As a consequence, the rotational torque can be smoothly transmitted from the disc plates 7, 8 to the boss 5.

Figure 14:
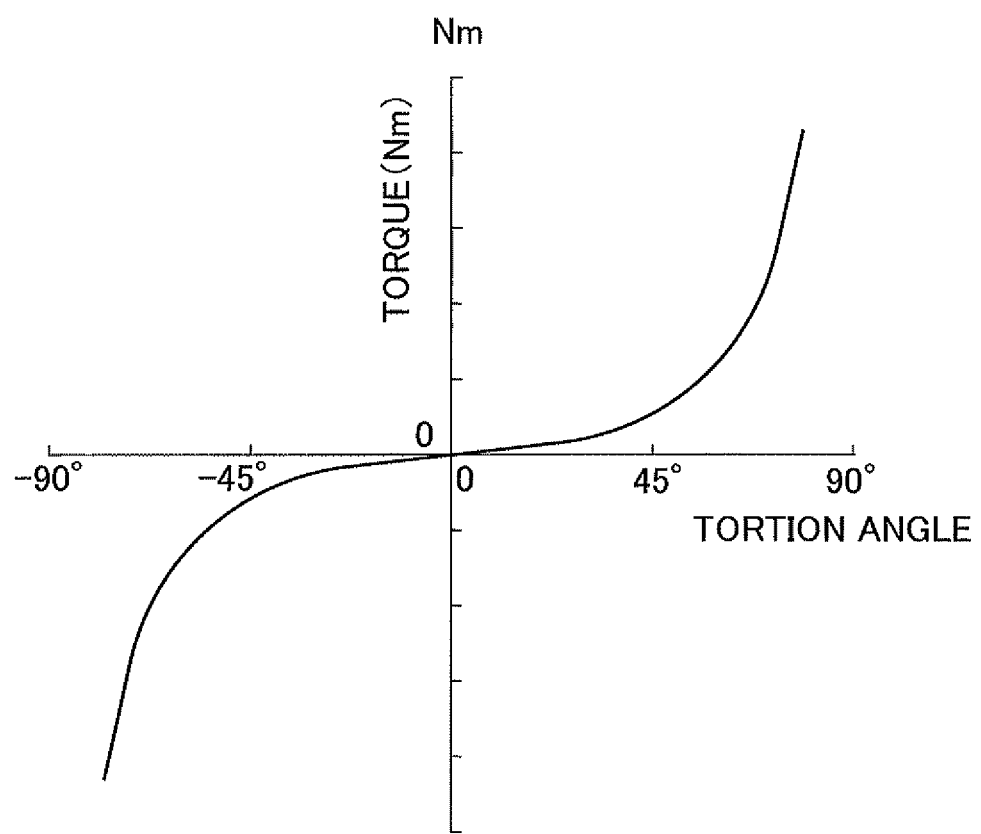
FIG. 14 is a view showing one preferred embodiment of the torsional vibration attenuation apparatus according to the present invention, and showing the relationship between the torsion angle of the torsional vibration attenuation apparatus and the rotational torque.

FIG. 14 is a view showing the torsion property of the disc plates 7, 8 and the boss 5, viz., a graph showing the relationship between the torsion angle of the disc plates 7, 8 and the boss 5 and the output torque to be outputted from the boss 5.

In FIG. 14, the horizontal axis indicates a relative torsion angle of the boss 5 with respect to the disc plates 7, 8, while the vertical axis indicates an output torque to be outputted from the boss 5. The output torque indicated by the vertical axis is responsive to the reaction force of the boss 5 against the disc plates 7, 8.

As shown in FIG. 14, the present embodiment is constructed to have the coil springs 4 compressed in response to the increased torsion angle of the boss 5 with respect to the disc plates 7, 8, so that the pressing force of the arm member 19 against the cam member 6 is increased.

The increased pressing force of the arm member 19 against the can member 6 causes the output torque to be increased. The fluctuation of the output torque caused at this time takes a curved torsion property continuously changed with no step portions.

In the present embodiment, the one end portion of the arm member 19 is held in contact with the elliptical cam surface 6a through the roller member 24, so that torsion angle of the disc plates 7, 8 and the boss 5 can be widened in response to the rotation of the cam member 6 to 180 degrees totaling the positive and negative sides Here, the magnitudes of the torsion property and the torsion angle caused when the disc plates 7, 8 and the boss 5 are relatively rotated with each other can be set at the desired torsion property and the torsion angle by adjusting the shape of the cam surface 6a of the cam member 6, the spring constant of the coil springs 4, and the shape of the arm member 19 and other factors.

Figure 17:
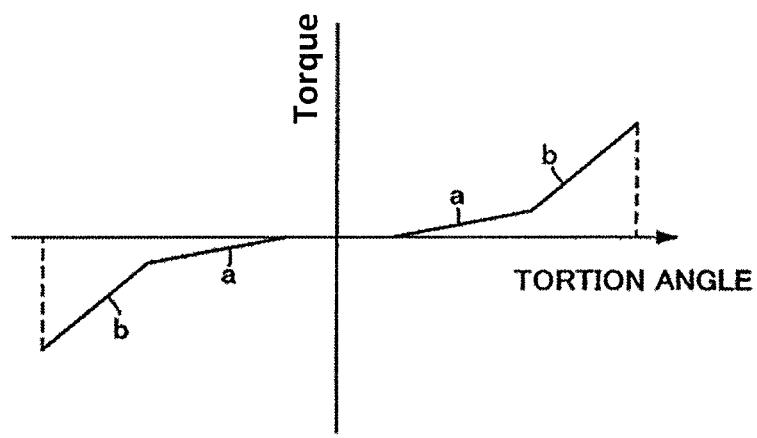
FIG. 17 is a view showing a conventional torsional property of disc plates and a hub.

FIG. 17 is a view showing the relationship between the rotational fluctuation of the internal combustion engine and the rotational speed of the internal combustion engine. As will be seen from FIG. 17, the torsional vibration attenuation apparatus 1 has a property in which the rotational fluctuation of the internal combustion engine is increased in response to the low rotational speed of the internal combustion engine at the acceleration time of the vehicle, and in which the rotational fluctuation of the internal combustion engine is increased in response to the high rotational speed of the internal combustion engine with what is called an engine brake generated at the deceleration time of the vehicle.

Figure 15:
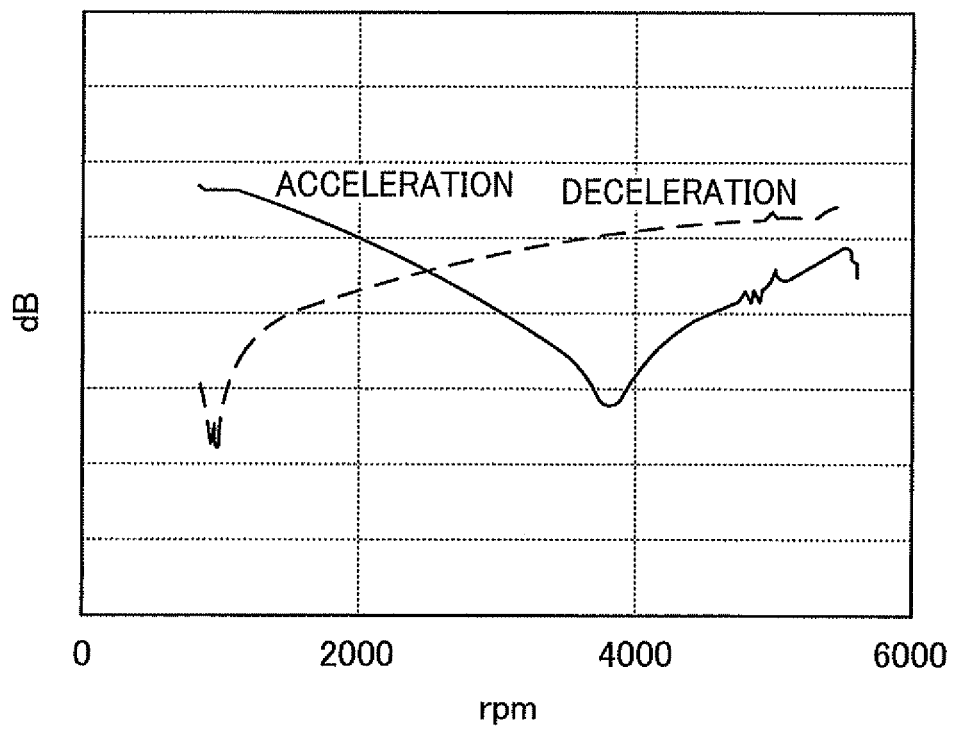
FIG. 15 is a view showing one preferred embodiment of the torsional vibration attenuation apparatus according to the present invention, and showing the relationship between the rotational fluctuation of the internal combustion engine and the rotational speed of the internal combustion engine.

The torsional resonance point of the driving system provided with the transmission exists to be caused during the normal rotation of the internal combustion engine (for example in the neighborhood of 2500 rpm where the solid line crosses the dotted line as shown in FIG. 15), so that the torsional resonance of the driving system is caused in the stage in which the rotational fluctuation of the internal combustion engine comes to be lowered until the rotational speed of the internal combustion engine reaches the normal rotation area.

The torsional vibration attenuation apparatus 1 according to the present embodiment can obtain the torsion property with the low torsional rigidity of the disc plates 7, 8 and the boss 5 when the disc plates 7, 8 and the boss 5 have a small torsion angle as shown in FIG. 14.

For this reason, in the area of a small rotational torque (output torque of the boss 5) transmitted to the boss 5 from the disc plates 7, 8 as seen from the vehicle shifted into the neutral state at the time of the idling state of the vehicle, the torsional vibrations originated from the rotational fluctuation in response to the torque fluctuation of the internal combustion engine can be attenuated, thereby making it possible to suppress the clattering noises from being caused in the gear pairs of the transmission maintained in the no load state Further, the range of the torsion angle of the disc plates 7, 8 and the boss 5 can be widened, thereby making it possible to reduce as a whole the torsional rigidity of the torsional vibration attenuation apparatus 1, so that the torsional vibration originated from the rotational fluctuation caused by the torque fluctuation of the driving source is attenuated at the acceleration time and the deceleration time of the vehicle when the rotational torque to be transmitted from the disc plates 7, 8 to the boss 5 is at a large level, thereby making it possible to suppress the chinking noises generated with the slipping gear pairs of the transmission gear sets being collided with each other.

The torsional vibration attenuation apparatus 1 according to the present embodiment can set the torsional rigidity at a level lower than the torsional rigidity of the conventional apparatus when the torsion angle of the disc plates 7, 8 and the boss 5 is at a large level, thereby making it possible to suppress the muffled noises in the passenger room by attenuating the torsional vibrations caused by the torsional resonance of the driving system.

In addition, the torsional vibration attenuation apparatus 1 according to the present embodiment is constructed to have the hysteresis mechanism 27 intervene between the disc plates 7, 8 and the cam member 6, thereby making it possible to generate a predetermined hysteresis torque when the disc plates 7, 8 and the cam member 6 are relatively rotated with each other.

For this reason, the torsional vibration attenuation apparatus 1 according to the present embodiment thus constructed can generate the hysteresis torque with respect to the large torsional vibrations which are originated from the rotational fluctuation caused by the torque fluctuation of the driving source during the acceleration and deceleration times when the rotational torque transmitted to the boss 5 from the disc plates 7, 8 is at a large level.

As a consequence, the torsional vibration attenuation apparatus 1 according to the present embodiment thus constructed can even further suppress the muffled noises from being generated in the passenger room by even further attenuating the torsional vibrations caused by the torsional resonance of the driving source, as well as can even further suppress the chinking noises.

The torsional vibration attenuation apparatus 1 according to the present embodiment thus constructed can make the torsion property in a non-linear shape with no multi-stage having a plurality of stepped portions as seen in the conventional torsion property, thereby making it possible to suppress the rattling noises from being generated. More specifically, the torsional vibration attenuation apparatus 1 according to the present embodiment thus constructed can suppress abnormal noises such as gear clattering noises caused by bouncing of the gears transmitting the rotational torque in the transmission when the torque transmitted from the disc plates 7, 8 to the boss 5 is approximately zero degrees in the travelling state at the slowly decelerating time of the vehicle When the disc plates 7, 8 are inputted with the excessively large torque from the internal combustion engine, the roller 24c of the arm member 19 can climb over the curvature maximum apex portion 6b of the cam surface 6a to have the disc plates 7, 8 slip with respect to the cam member 6, thereby making it possible to have the cam member 6 function as a torque limiter.

As a consequence, the excessively large torque from the disc plates 7, 8 is prevented from being transmitted to the boss 5, thereby making it possible to protect the transmission gear sets of the transmission.

In the present embodiment, the curvature of the cam surface 6a is increased in response to the increased torsion angle of the boss 5 and the disc plates 7, 8, thereby increasing the resilient deformation amount of the coil springs 4. For this reason, no existence of the roller member 24 at the one end portion of the arm member 19 causes the contact pressure of the one end portion of the arm member 19 and the cam member 6 to be increased, thereby likely causing the contact surfaces of the one end portion of the arm member 19 and the cam member 6 to be abraded.

In the present embodiment, the one end portion of the arm member 19 is held in slideable contact with the cam surface 6a of the cam member 6 through the roller 24c, thereby making it possible to prevent the contact pressure of the one end portion of the arm member 19 and the cam member 6 to be heightened, and thereby to suppress the one end portion of the arm member 19 and the cam member 6 from being abraded.

In the present embodiment, the roller 26c is rotatably supported on the other end portion of the arm member 19, and the other end portion of the arm member 19 is held in engagement with the spring seat 16 through the roller 26c, so that the coil spring 4 can be circumferentially resiliently deformed in the circumferential direction of the disc plates 7, 8 while smoothly sliding the other end portion of the arm member 19 along the circumferential outer peripheral surface of the spring seat 16 through the roller member 26.

The torsional vibration attenuation apparatus 1 according to the present embodiment is simple in construction only with the coil springs 4, the arm members 19 and the cam member 6 which are provided between the disc plates 7, 8 and the boss 5, thereby making it possible to widen the torsion angle of the disc plates 7, 8 and the boss 5. This means that the construction of the torsional vibration attenuation apparatus 1 can be simplified.

The arm members 19 are arranged in point symmetrical relationship with each other with respect to the center axis of the disc plates 7, 8 in the present embodiment, the arm members 19 can sandwich the cam member 6 and support the cam member 6 across the center axis of the disc plates 7, 8.

For this reason, the arm members 19 can sandwich and support the cam member 6 under a strong pressuring force across the center axis of the disc plates 7, 8 by the reaction of the coil springs 4 when the coil springs 4 are urged by the arm members 19 through the arm members 19. As a result, the rotational torque can reliably be transmitted from the disc plates 7, 8 to the boss 5.

Figure 16:
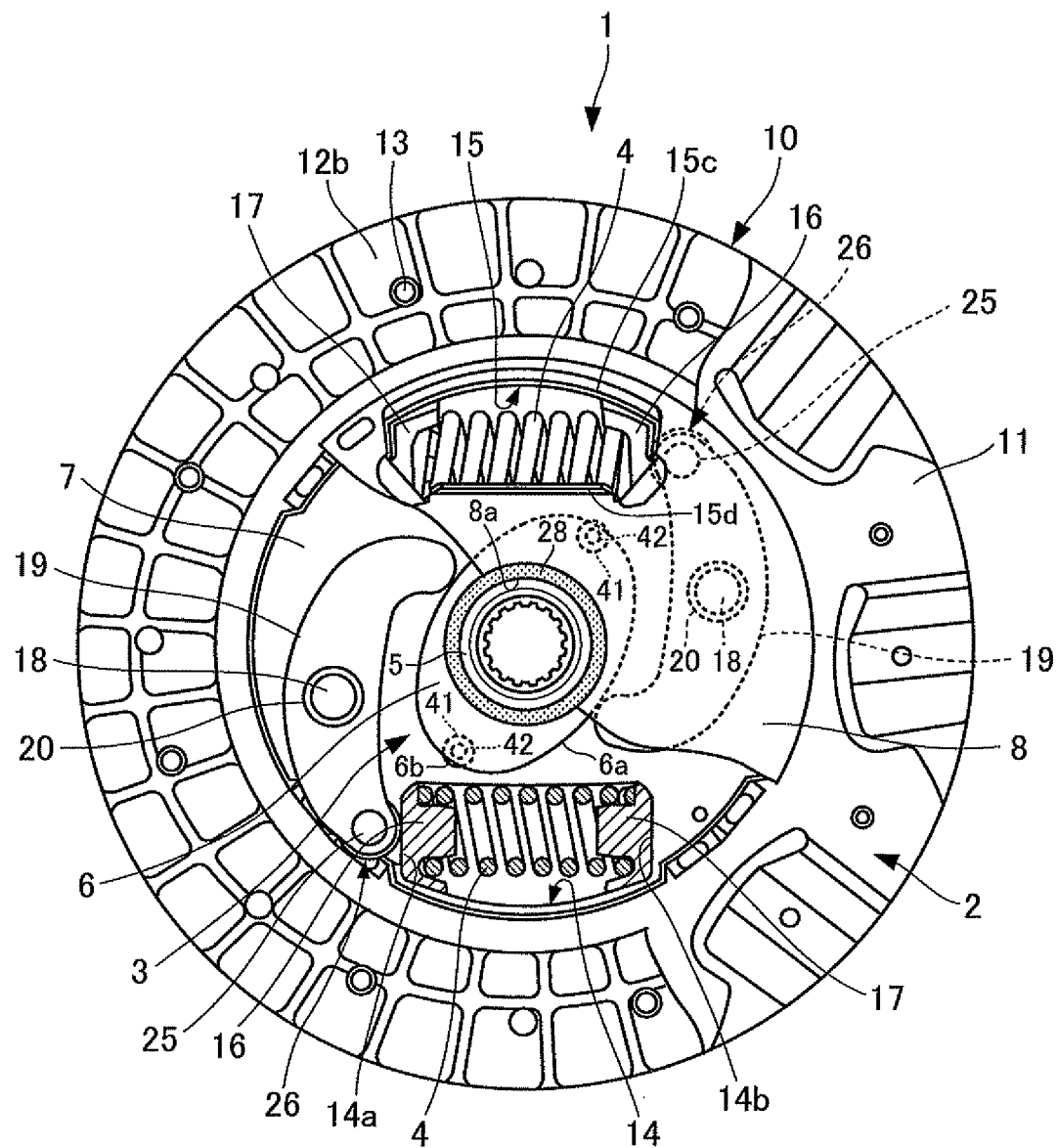
FIG. 16 is a view showing one preferred embodiment of the torsional vibration attenuation apparatus according to the present invention, and showing a front view of the torsional vibration attenuation apparatus having a cam member attached with needle bearings.

Although the present embodiment has been explained with the roller member 24 supported on the arm members 19, the present invention is not limited to this embodiment, but may be partly constituted by one or more roller members 41 each rotatably supported on the cam member 6 as a roller element as shown in FIG. 16.

The roller members 41 are rotatably supported on the cam member 6 in such a manner that each of the roller members 41 is received in a groove formed on the outer peripheral portion of the cam member 6 and rotatably supported on a pin 42 extending on the cam member 6 across the groove. The roller members 41 are arranged to partly project from the groove radially outwardly of the cam surface 6a.

The positions of the roller members 41 are set on the sections of the cam surface 6a to be held in engagement with the one end portions of the arm members 19 when the torsion set angle of the boss 5 and the disc plates 7, 8 takes a maximum value.

Here, the sections of the cam surface 6a to be held in engagement with the one end portions of the arm members 19 when the torsion set angle of the boss 5 and the disc plates 7, 8 takes a maximum value indicate the apex portions 6b held in engagement with the one end portions of the arm members 19 when the boss 5 and the disc plates 7, 8 are relatively rotated with each other and each having a largest curvature.

More specifically, the roller 24c of the arm member 19 can climb over the curvature maximum apex portion 6b of the cam surface 6a to have the cam member 6 function as a torque limiter, so that the torsion set angle is a set angle (positive side 90 degrees, negative side 90 degrees in the present embodiment) until the cam member 6 functions as the torque limiter.

As will be seen from the foregoing construction, the roller members 41 are provided on the sections of the cam surface 6a where the one end portions of the arm members 19 and the cam member 6 are highest in contact pressure, so that the contact pressures of the one end portions of the arm members 19 and the cam member 6 can be prevented from being heightened, thereby making it possible to suppress the one end portions of the arm members 19 and the cam member 6 from being abraded.

Although the above explanation has been made about the fact that the roller members 41 are provided on the sections of the cam surface 6a of the cam member 6 where the torsion angle of the boss 5 and the disc plates 7, 8 takes a maximum value, more roller members 41 may additionally be provided on the sections of the cam surface 6a in the circumferential direction of the cam surface 6a according to the present invention.

Though the present embodiment has been explained about the example that the disc plates 7, 8 constitute a driving rotation member while the boss 5 constitutes a driven rotation member, the disc plates 7, 8 may instead constitute a driven rotation member while the boss 5 may constitute a driving rotation member according to the present invention.

While the present embodiment has been explained with the example that the torsional vibration attenuation apparatus 1 intervenes between the internal combustion engine of the vehicle and the driving system having the transmission, the present invention is not limited to this example, but may include any type of torsional vibration attenuation apparatus which is provide in the driving system of the vehicle.

The foregoing torsional vibration attenuation apparatus according to the present invention may be applied for example to a hybrid vehicle having a torsional vibration attenuation apparatus serving as a hybrid damper intervening between the output shaft of the internal combustion engine and a power distribution mechanism for dividing the power to an electric motor and a wheel side output shaft.

Further, the torsional vibration attenuation apparatus according to the present invention may be applied to a torsional vibration attenuation apparatus serving as a lock-up damper intervening between a lock-up clutch apparatus of a torque converter and transmission gear sets. Further, the torsional vibration attenuation apparatus according to the present invention may be provided between a differential case and a ring gear provided on the outer peripheral portion of the differential case. Although the present embodiment has been explained raising an example that the cam surface 6a of the cam member 6 is in an elliptical shape, the present invention is not limited to the above shape if the cam surface 6a has a curvature fluctuated in response to the changed torsion angle of the disc plates 7, 8 and the boss 5.

Each of the previously mentioned embodiments has been raised as an example for explaining the invention, and thus the present invention is not limited to these embodiments. The scope of the present invention is required to be construed based on the claims. All the modifications, the alterations and the equivalents should be included within the scope of the invention defined by the claims.

As has been explained in the above description, the torsional vibration attenuation apparatus according to the present invention has such an excellent advantage that the torsional vibration attenuation apparatus according to the present invention can widen the range of the torsion angle of the driving rotation member and the driven rotation member and can obtain the torsional property in the non-linear shape. Especially, the torsional vibration attenuation apparatus according to the present invention has an excellent effect which can prevent an excessively large torque from being transmitted to the driven rotation member from the driving rotation member. The torsional vibration attenuation apparatus according to the present invention is useful as a torsional vibration attenuation apparatus constructed to have the driving rotation member inputted with the rotational torque and the driven rotation member outputting the rotational torque of the driving rotation member, the driving rotation member and the driven rotation member being relatively rotatably connected with each other through the resilient member.

EXPLANATION OF REFERENCE NUMERALS

1: torsional vibration attenuation apparatus
2: driving rotation member
3: driven rotation member
4: coil spring (resilient member)
5: boss (first rotation member)
6: cam member
6a: cam surface
7, 8: disc plate (second rotation member)
10: clutch disc (second rotation member)
14, 15: accommodation window hole (accommodation portion)
14c, 15c: outer support edge portion (accommodation portion)
14d, 15d: inner support edge portion (accommodation portion)
16, 17: spring seat (retaining member)
18: pin (swinging fulcrum portion)
19: arm member
21: input shaft
24, 41: roller member (roller element)
26: roller member (rolling member)
27: hysteresis mechanism

The invention claimed is:

1. A torsional vibration attenuation apparatus, comprising:
a driving rotation member inputted with a rotational torque;
a driven rotation member disposed in coaxial relationship with the driving rotation member to output the rotational torque of the driving rotation member;
one or more resilient members each disposed between the driving rotation member and the driven rotation member to be resiliently deformed in the circumferential direction of the driving rotation member when the driving rotation member and the driven rotation member are relatively rotated with each other;
a cam member provided on either one of the driving rotation member and the driven rotation member to be integrally rotated with either one of the driving rotation member and the driven rotation member and having a cam surface having an curvature varied in response to the variation of the torsion angle of the driving rotation member and the driven rotation member; and
one or more arm members each having one end portion held in contact with the cam surface of the cam member and the other end portion held in engagement with the circumferential end portion of the resilient member and swingable around a swing fulcrum portion provided on either one of the driving rotation member and the driven rotation member, and the cam member and the one end portion of the arm member having respective sliding surfaces between which a roller element is provided,
wherein the driven rotation member is provided with a first rotation member having an outer peripheral portion constituting the cam member, and an inner peripheral portion drivably connected with the input shaft of a transmission,
wherein the driving rotation member is provided with a pair of second rotation members disposed between both the axial sides of the first rotation member and axially spaced apart at a predetermined interval with each other and fastened to each other, each of the second rotation members being formed with a pair of accommodation portions each accommodating therein the resilient member, and a pair of retaining members retaining both of the circumferential end portions of the resilient member to have the resilient member supported on the both of circumferential end portions of the accommodation portion, and
wherein the other end portion of the arm member has a roller element and is held in engagement with one of the pair of the retaining members through the roller element.

2. The torsional vibration attenuation apparatus as set forth in claim 1, in which the roller element is rotatably supported on the one end portion of the arm member.

3. The torsional vibration attenuation apparatus as set forth in claim 1, in which the roller element is rotatably supported on the cam member at a surface position with which the one end portion of the arm member is engaged when the driving rotation member and the driven rotation member take an maximum torsion set angle.

4. The torsional vibration attenuation apparatus as set forth in claim 1, in which the curvature of the cam surface of the cam member is increased as the torsion angle is increased from the initial position of the cam member where the driving rotation member and the driven rotation member take a minimum torsion angle.

5. The torsional vibration attenuation apparatus as set forth in claim 1, which comprises two or more arm members, which are disposed in point symmetrical relationship with each other across the center axis of the driving rotation member.

6. The torsional vibration attenuation apparatus as set forth in claim 1, which further comprises a hysteresis mechanism intervening between the cam member and one of the second rotation members to have the cam member and the second rotation member held in friction contact with each other.

* * * * *